United States Patent
Stern et al.

(10) Patent No.: US 6,810,136 B2
(45) Date of Patent: Oct. 26, 2004

(54) SYSTEM AND METHOD FOR AUTOMATIC PREPARATION OF DATA REPOSITORIES FROM MICROFILM-TYPE MATERIALS

(75) Inventors: Yonatan P. Stern, Hod Hasharon (IL); Emil Steinvil, Kfar Saba (IL)

(73) Assignee: Olive Software Inc., Denver, CO (US)

( * ) Notice: Subject to any disclaimer, the term of this patent is extended or adjusted under 35 U.S.C. 154(b) by 71 days.

(21) Appl. No.: 10/272,926

(22) Filed: Oct. 18, 2002

(65) Prior Publication Data

US 2004/0076327 A1 Apr. 22, 2004

(51) Int. Cl.$^7$ .................................................. G06K 9/00
(52) U.S. Cl. ................................................... 382/123
(58) Field of Search .................................. 382/112, 137, 382/173, 181, 305–306, 309–311; 235/375, 379, 435, 454, 470; 348/118; 355/64; 705/33, 35, 42, 45; 707/1, 9, 10, 30, 100, 200; 715/500.1, 526, 530

(56) References Cited

U.S. PATENT DOCUMENTS

| | | | | |
|---|---|---|---|---|
| 5,052,042 A | * | 9/1991 | Morton et al. | 382/305 |
| 5,191,525 A | * | 3/1993 | LeBrun et al. | 715/500 |
| 5,237,156 A | * | 8/1993 | Konishi et al. | 235/375 |
| 5,301,350 A | * | 4/1994 | Rogan et al. | 705/33 |
| 5,687,250 A | * | 11/1997 | Curley et al. | 382/112 |
| 5,895,455 A | * | 4/1999 | Bellinger et al. | 705/35 |
| 5,917,965 A | * | 6/1999 | Cahill et al. | 382/305 |

* cited by examiner

Primary Examiner—Jose L. Couso
(74) Attorney, Agent, or Firm—G.E. Ehrlich (1995) Ltd.

(57) ABSTRACT

A system and a method for the conversion of archived documents to a digital format and storage of the data extracted in repositories which may be easily extracted and searched by a user over a network such as the Internet. The data is preferably stored in the form of microfilm, although optionally the present invention could be operative with other types of physical media, such as microfiche, paper and any type of printed material. The microfilm data is preferably divided and/or grouped into at least one file. Optionally and preferably, each file undergoes the following automatic processing stages: combining files; analyzing image layout; segmentation; OCR; optional segmentation improvement; and output to XML, or another suitable output data format and/or language. In the last stage, the data contained in the files is preferably extracted and then more preferably transmitted to the relevant repository unit.

16 Claims, 9 Drawing Sheets

SYSTEM AND METHOD FOR AUTOMATIC PREPARATION OF DATA REPOSITORIES FROM MICROFILM-TYPE MATERIALS

FIELD OF THE INVENTION

The present invention relates to a system and a method for the automatic preparation and searching of microfilm-type materials, particularly for newspapers and magazines stored on microfilm or microfiche, the conversion of those documents to a digital format and storage of the information contained therein in searchable repositories.

BACKGROUND OF THE INVENTION

As the Internet grows, many different types of Web sites are becoming connected and therefore are available to users. These Web sites may contain information which is of interest to users, such as news for example. Indeed, many Internet users today obtain at least a portion of their news information from Web sites which publish such information.

Traditional newspapers and other sources of news have therefore been forced to embrace the new media which is represented by Web pages. Currently, many traditional (print) newspapers have Web sites which contain at least a portion of the news and information which is available through the print version of the newspaper. However, archived newspaper and magazine material, which is currently stored in microfilm, is not so readily accessible for publication through the Internet or any other type of network. Newspaper publishers, libraries and other repositories have huge amounts of information which is stored on microfilm. Such microfilm documents represent a huge asset, which cannot currently be properly used. The advantage of microfilm is that it preserves the appearance of the newspaper, magazine or other paper document, as well as the data contained therein. The disadvantage, of course, is that searching through microfilm archives for the information of interest is tedious and difficult. Furthermore, microfilm can only be read at one physical location, since the data cannot be transmitted over a network, for example. Thus, microfilm has a number of significant problems.

Attempts to provide a solution unfortunately have a number of drawbacks. For example, scanning the microfilm documents in order to be able to provide the data through a computer results in a number of errors during the process of OCR (optical character recognition). This process is required for the textual data to be electronically searchable; however, the resultant errors cause the final text to be difficult to search accurately. Correcting these errors manually is a tedious and expensive process, yet currently if these errors are not corrected, the resultant text may not be searchable.

A further attempt to provide searches for text with errors is the "fuzzy search" process, in which a requested keyword and variations on that keyword are all searched simultaneously. Unfortunately, this search method is ineffective for large databases, since too many irrelevant hits are retrieved.

A more useful and efficient system for the automatic preparation and searching of scanned documents is disclosed in PCT Application No. IL01/00797m, by the present inventors and incorporated by reference as if fully set forth herein. In the disclosed system the probability of errors occurring during the preparation of the scanned documents is incorporated into the searching process.

An even more useful solution would provide a complete system for the automatic preparation of a repository of searchable files from archived material. Furthermore such a solution should also be cost effective, operate at least semi-automatically, and also permit access to archived material, and in particular microfilm documents, through an electronic interface. Unfortunately, such a solution is not currently available.

SUMMARY OF THE INVENTION

The background does not teach or suggest a system or a method for automating the conversion of microfilm data to a digital format, and the creation of searchable data repositories from the converted digital data. The background art also does not teach or suggest a system and method for enabling users to access the data repositories through a network such as the Internet. The background art also does not teach or suggest a cost effective, at least semi-automatic method for converting microfilm data to a form which can be readily accessed through an electronic interface.

The present invention overcomes these deficiencies of the background art by providing a system and a method for automatically converting microfilm data in to repositories of data in a digital format which may be easily accessed by a user across a network such as the internet. First, preferably a planning phase is performed, in which the production parameters are set depending on a number of conditions such as the nature of the material and the requirements of the customer. Next, preferably data from scanned microfilm reels goes through a preparation phase in which the scanned reels are subdivided. For example a microfilm reel of a newspaper would be subdivided into one or more issues each of which would be saved in a separate data file. Once the files are extracted from the reel, a profile is preferably prepared and jobs are generated. Each file is preferably assigned its own job. The "Automatic Processing" phase executes the generated jobs. As a result every file optionally and preferably undergoes the following automatic processing stages: combining files; analyzing image layout; segmentation; OCR; optional segmentation improvement; and output to XML. In the last stage, the data contained in the files is preferably extracted and then more preferably transmitted to the relevant repository unit.

According to more preferred embodiments of the present invention the system is capable of managing more than one conversion project at any one time, with each project containing one or more publications. Each publication is preferably divided to one or more collections and a search index will be produced for each collection in order to enable accessibility of archived issues, through the use of such search indexes Hereinafter, the term "network" refers to a connection between any two or more computational devices which permits the transmission of data.

Hereinafter, the term "computational device" includes, but is not limited to, any type of computer operating according to any type of hardware and/or operating systems; or any device, including but not limited to: laptops, hand-held computers, PDA (personal data assistant) devices, cellular telephones, any type of WAP (wireless application protocol) enabled device, wearable computers of any sort, or any other device which has an operating system.

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

In addition, the present invention could be implemented as software, firmware or hardware, or as a combination thereof. For any of these implementations, the functional steps performed by the method could be described as a plurality of instructions performed by a data processor.

Hereinafter, the term "Web browser" refers to any software program which can display text, graphics, or both, from Web pages on World Wide Web sites. Hereinafter, the term "Web server" refers to a server capable of transmitting a Web page to the Web browser upon request.

Hereinafter, the term "Web page" refers to any document written in a mark-up language including, but not limited to, HTML (hypertext mark-up language) or VRML (virtual reality modeling language), dynamic HTML, XML (extensible mark-up language) or XSL (XML styling language), or related computer languages thereof, as well as to any collection of such documents reachable through one specific Internet address or at one specific World Wide Web site, or any document obtainable through a particular URL (Uniform Resource Locator). Hereinafter, the term "Web site" refers to at least one Web page, and preferably a plurality of Web pages, virtually connected to form a coherent group.

Hereinafter, the phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

Hereinafter, the term "microfilm-type material" includes, but is not limited to, microfilm and microfiche.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and a method for the conversion of archived documents to a digital format and storage of the data extracted in repositories which may be easily extracted and searched by a user over a network such as the Internet. The data is preferably stored in the form of microfilm-type material, particularly microfilm, although optionally the present invention could be operative with other types of physical media, such as microfiche, paper and any type of printed material. Although the following discussion centers around microfilm, it should be noted that this is for the purposes of discussion only and is without any intention of being limiting, as the present invention is suitable for any type of microfilm-type material, and may also be used with other types of physical media as described above.

The microfilm data is preferably divided and/or grouped into at least one file. Optionally and preferably, each file undergoes the following automatic processing stages: combining files; analyzing image layout; segmentation; OCR; optional segmentation improvement; and output to XML, or another suitable output data format and/or language. In the last stage, the data contained in the files is preferably extracted and then more preferably transmitted to the relevant repository unit.

According to preferred embodiments of the present invention there is provided a system for the conversion of microfilmed documents into an electronic format at the storage of the data obtained from the microfilm document in at least one of a plurality of data repositories which preferably contain one or more electronic image of the original one or more documents stored on the microfilm and data from the document in a form which may by easily accessed and searched in an internet environment, most preferably in XML format.

The present invention enables automatic processing of documents to be performed, from the initial scanning stage (in which the document, present on a physical media is converted to electronic data) to the output processed data. The physical media is optionally and preferably at least one of microfilm, microfiche, paper and any other printed media format. The processed data is preferably searchable, yet can optionally be displayed in an electronic facsimile of the original physical media document. The automatic processing of the present invention more preferably at least initially includes separation of double page frames, deskewing of each page image, image cleaning to improve compression and clarity, and optional collection of the data into issues according to the original output material.

Separation of double page frames may optionally include separation of two pages and/or page fragments in one frame, as well as separation of an actual page or pages from corrupted portions of the image and/or damage to the original physical material, which may appear on the image. This process also preferably includes combining fragments which may appear in one frame. The process of separation of double page frames optionally and more preferably includes cropping page images out of black frames.

Deskewing may optionally be performed according to any algorithm which is known in the art.

Image cleaning preferably includes any processing to increase the clarity of the image, such as overcoming damage to the document (such as wrinkled edges, dirt, stains and so forth) which may distort the image of the document, as well as overcoming any other type of non-linear distortion to the image.

Issue binding preferably involves collecting the images according to the original grouping of the original documents, such as an issue of a newspaper or magazine for example. More preferably, the images are collected by first placing them in sequence, and then marking the image of the initial page as the first image. This stage may optionally be performed manually, automatically or semi-automatically.

The output of this initial process is data which is prepared for the next stages of analysis and conversion.

The process then preferably continues with the stage of analysis of the prepared data, which optionally and more preferably include zoning of text areas on the page, OCR of text areas, and logical segmentation of page objects. The stages of logical segmentation and OCR may optionally be switched. The final conversion stage preferably results in creation of the final active data, more preferably in an XML format. The stages of analysis and conversion are optionally and preferably performed as described in published PCT Application No. WO 01/98948m, filed on Jun. 15 2001m, which is owned in common with the present application and which is hereby incorporated by reference as if fully set forth herein.

The principles and operation of the present invention may be better understood with reference to the drawings and the accompanying description. Although the following discussion centers around the conversion of microfilmed newspapers and storage of the data obtained in XML based repositories, it must be understood that system could equally be applied to the conversion of any archived documents stored as microfilm or otherwise, to be stored in repositories in any appropriate accessible and searchable format such as Adobe Acrobat, HTML or otherwise.

Figure 1A:
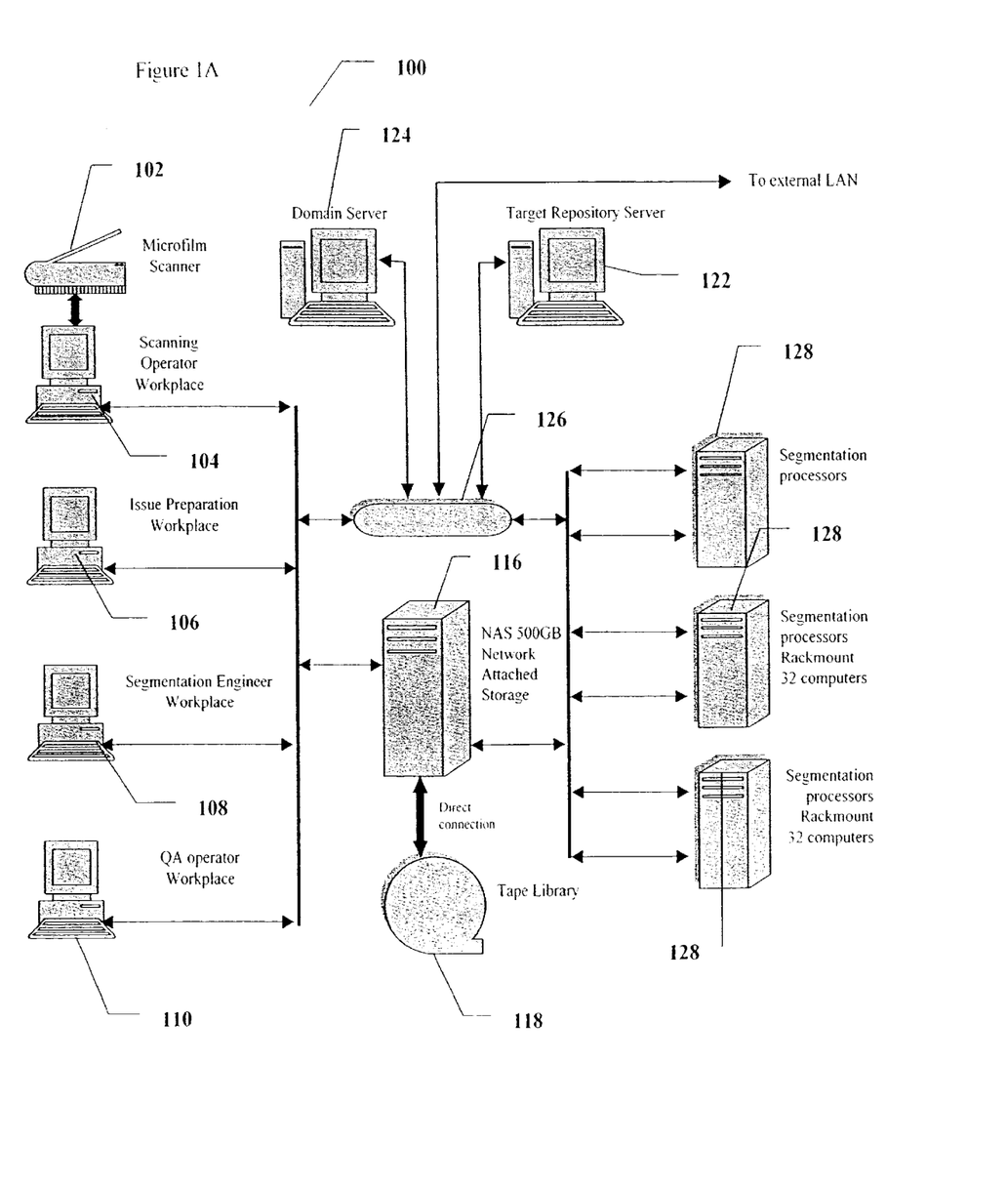
FIGS. 1A and 1B are schematic block diagrams of an exemplary system according to the present invention.

FIG. 1A shows a schematic block diagram of an exemplary system according to the present invention. As shown a system 100 preferably features a scanner 102 for scanning the document in the physical media. For the purposes of illustration only and without any intention of being limiting, scanner 102 is shown as a microfilm scanner. Scanner 102 is optionally and more preferably controlled through a scanning operator workstation 104, although alternatively or additionally, such control is performed automatically. The data is then preferably sent from scanning operator workstation 104 to an issue preparation workstation 106, which preferably collects the data into coherent units. For a newspaper or other type of document that is periodically published, such coherent units may optionally be issues, for example.

The collected and organized data is preferably sent to a segmentation workstation 108, which again may optionally be operated automatically, manually or semi-automatically. Segmentation workstation 108 preferably performs the processing that is required to convert a collection of data into a searchable electronic document, as described in greater detail below with regard to the exemplary method of FIG. 2. Optionally, the results of one or more processes are examined in greater detail by a quality assurance workstation 110, again automatically, manually or semi-automatically.

According to preferred embodiments of the present invention, the operational flow through system 100 is preferably controlled by a control server 112. According to other preferred embodiments of the present invention, in order to provide sufficient processing power to the segmentation process, one or more segmentation processors 114 preferably perform one or more operations required for segmentation, as described in greater detail below.

Optionally and preferably, one or more storage units 116 are also provided, which more preferably are directly connected to a tape library 118. Each storage unit 116 is preferably used to store the data, such as the microfilm data for example, during processing. The final prepared data is preferably stored on a tape in tape library 118, although optionally other types of storage media could also be used. Tape library 118 may optionally and preferably be implemented as any type of tape mechanism which is capable of automatically handling tapes. According to preferred embodiments of the present invention, a target repository server 122 transforms the prepared data into the output format, such as XML for example, and also sends the output format data to the external repository (not shown). It should be noted in this context that storage unit or units 116, and/or tape library 118, are intended for the internal use of system 100, and are not intended for access by external users, in contrast to the external repository (not shown). Rather, tape library 118 is preferably intended to store at least one additional copy of any data which is sent to the external repository, for at least a minimum period of time. For example, such a minimum period of time may last until the client who owns and/or manages the external repository indicates that the output format data has been safely received. Such an example is preferred if the output format data is sent to the requesting client in a hard media format, such as tapes for example.

System 100 also optionally and preferably features a domain server 124, which preferably controls the components of system 100 with regard to traffic over the network. The network connection itself is preferably maintained through a switch 126, or other network component for managing and/or routing network traffic.

System 100 also preferably features at least one, but more preferably a plurality of segmentation processors 128, of which three are shown for the purposes of illustration only and without any intention of being limiting. Each segmentation processor 128 preferably performs the computational intensive methods which are required for processing the microfilm data into the final format, as described in greater detail below.

Figure 1B:
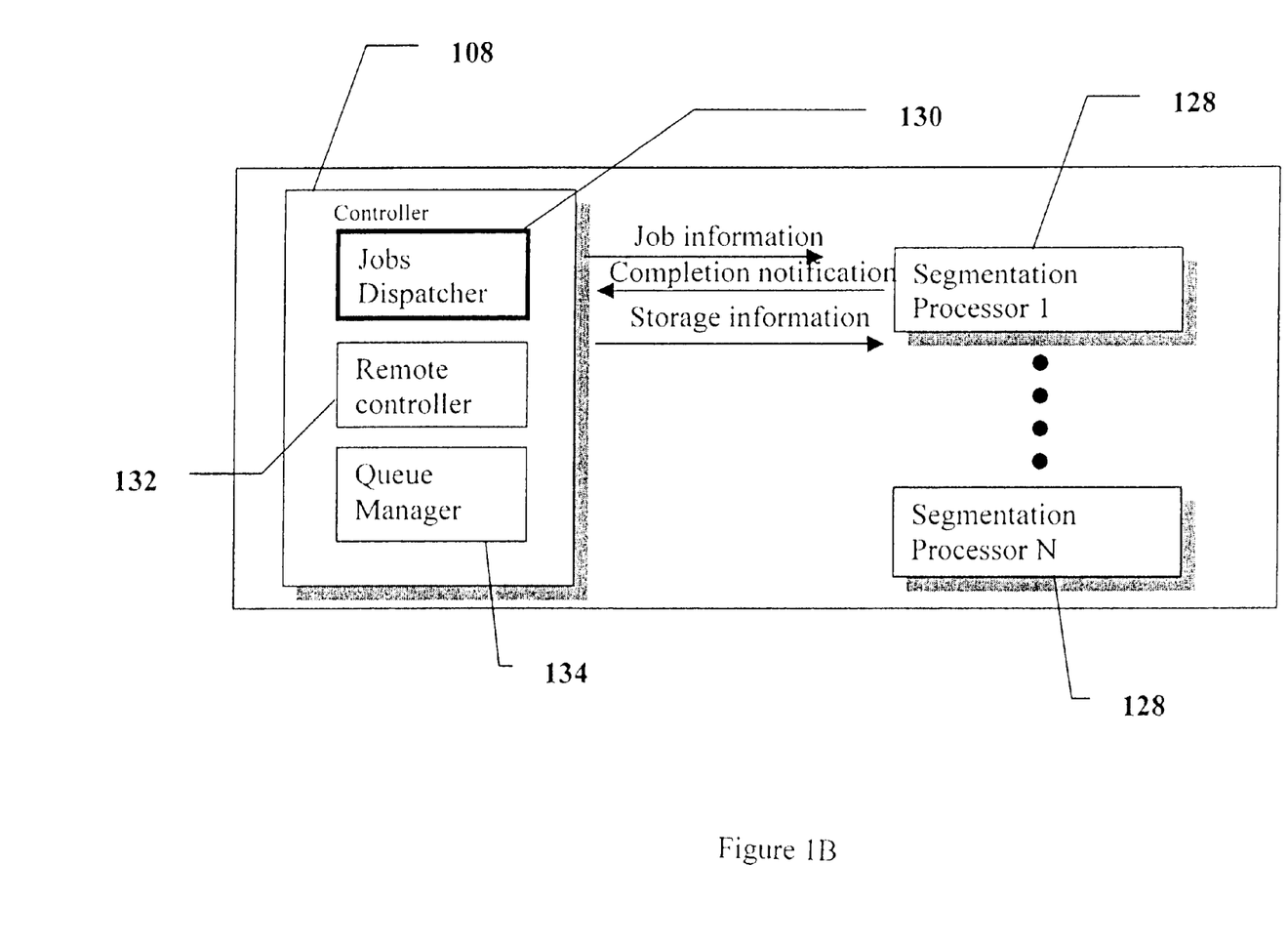

FIG. 1B shows a more detailed view of the operation of two components of FIG. 1A, segmentation workstation 108 and segmentation processors 128. As shown, segmentation workstation 108 optionally and more preferably comprises a job dispatcher 130 for sending each job to a segmentation processor 128. As described in greater detail below, each job includes one or more images of microfilm which are to be processed together. Job dispatcher 130 preferably sends the job itself to segmentation processor 128, together with a set of work instructions for performing the job, which optionally and more preferably include the parameters detected during the test scans, as described in greater detail below.

Once the job has been completed, segmentation processor 128 preferably notifies a remote controller 132, which then sends storage information to segmentation processor 128. The storage information may optionally include the path or address of storage unit 116 to which the processed data is to be sent for storage.

A queue manager 134 optionally and more preferably controls the queue of jobs being sent to all segmentation processors 128, for example in order to avoid overloading any segmentation processor 128, while also avoiding having any such segmentation processor 128 remain idle.

Figure 2:
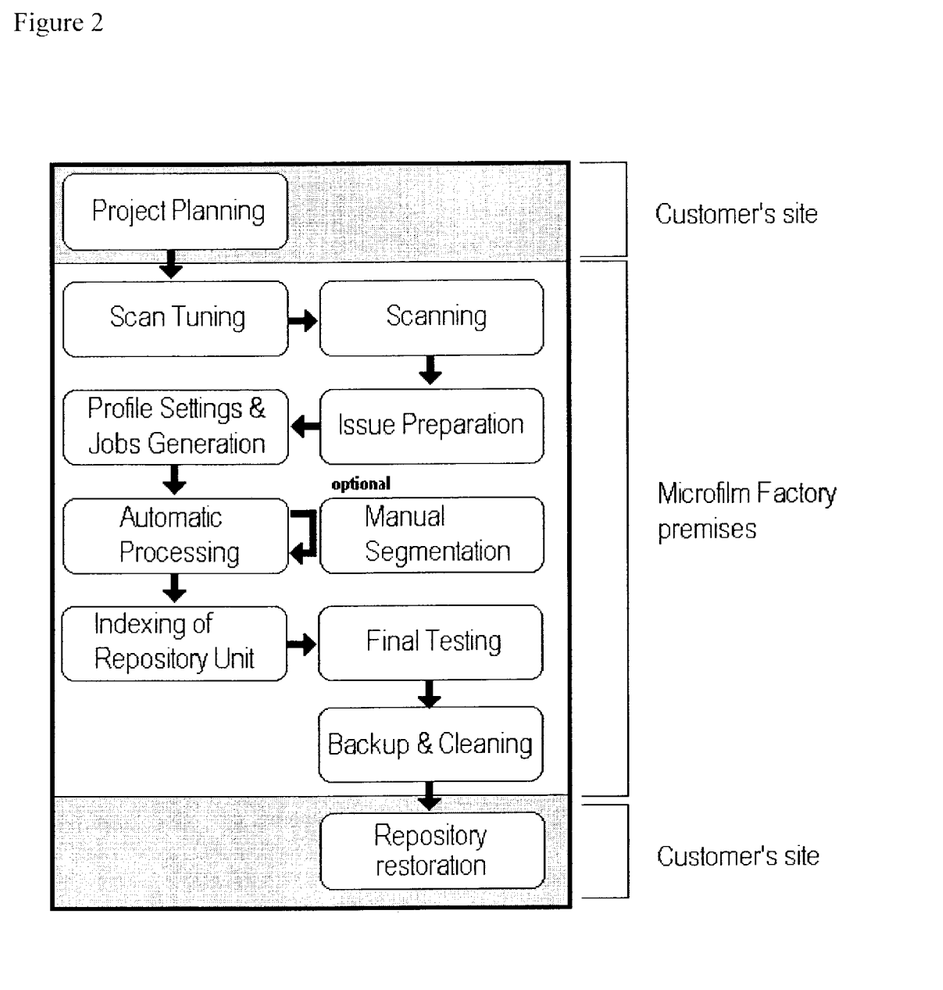
FIG. 2 is a flowchart of an overall illustrative method according to the present invention.

FIG. 2 is a schematic flow diagram of an exemplary method according to the present invention. As shown the first stage is the planning stage, in which a number of factors are considered which may influence the later stages of the process. Such factors may include, but are not limited to, customer requirements; system architecture; general hardware requirements; project targets, which must be clearly defined by the customer; and delivery targets. In addition, optionally and more preferably, such factors as the launch date, which may occur during the conversion process or after completion of such a process; required customization according to the customer requirements, in which the process is preferably optimized to fit one or more requirements of the customer; microfilm accessibility; and microfilm generation parameters. The latter type of parameters preferably provide information about those parameters that were originally used when the microfilms were generated, which is preferred because it reduces the necessity for scanner tuning.

Optionally and more preferably, the planning stage also includes analysis of the documents to be converted for considering criteria which may include, but are not limited to, the following factors: total number of microfilm pages; total number of entities (a page contains a number of elements); historical layout changes; and microfilm quality. Other factors more preferably include but are not limited to, recognition optimization; material to be tested for tuning the recognition process (OCR or optical character recognition of the scanned data); search index optimization; definition of collections based on time periods in the archive; final storage requirements; storage size and number of backup tapes or other backup media; and backup media tape format and backup software.

Recognition optimization is optionally and more preferably performed as part of the planning stage, and includes such processes as determining the language of the documents; analyzing the overall layout of the document, as well as the layout and fonts for individual pages, and also analyzing other characteristics of the document which are particular to that document, and which may also affect the overall recognition process.

With regard to definition of collections based on time periods in the archive, this process is preferably performed for periodical documents, such as newspapers for example, and involves the collection of information about the organization of documents in the archive according to time. For example, an academic journal (magazine) may optionally be organized according to volumes. Newspapers may optionally be organized according to years. Other types of organization are also possible, of course. These time-based definitions typically increase the speed and efficiency of operation of a search engine through the output format data, for example.

Figure 3A:
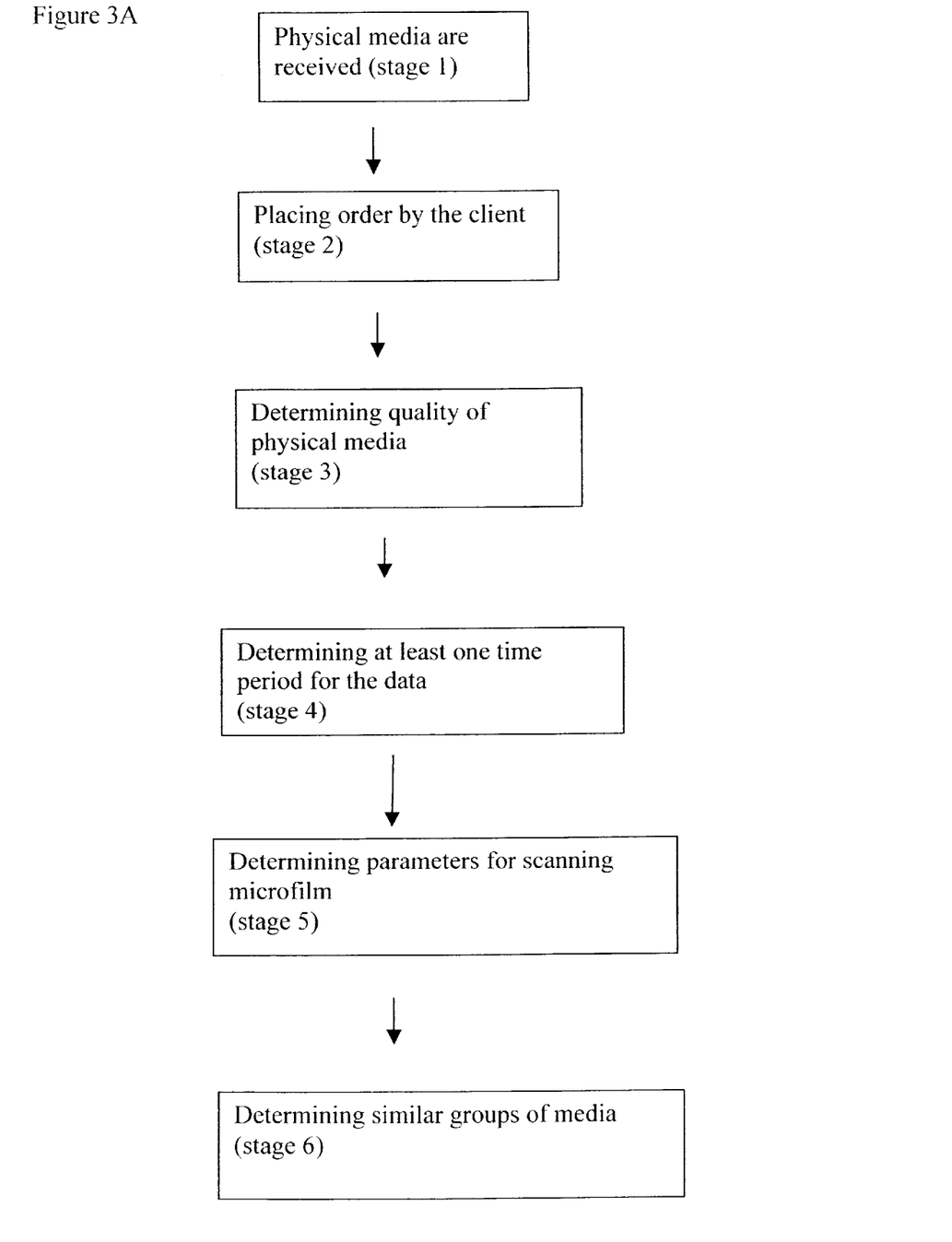
FIGS. 3A–3C are flowcharts of illustrative methods of the present invention for performing particular stages of the method of FIG. 2.

Overall, the planning stage preferably features the following processes, as shown with regard to FIG. 3A. In stage 1, the physical media are received. In stage 2, optionally a particular type of order is placed by the client, for example to process microfilm documents into a fully searchable output data format. In stage 3, the quality of the received physical media is determined. As previously described, the term "quality" optionally refers to the physical condition of the media, such as microfilm for example, but more preferably refers to the quality of the images on that physical media. In stage 4, various time periods are optionally and preferably determined, as previously described. In stage 5, the parameters and the detailed procedure for actually scanning the microfilm and/or other physical media are preferably determined, more preferably according to information received in the previous stages. In stage 6, optionally similar groups of physical media are determined according to the parameters and detailed procedure of stage 5, in order to be able to process physical media having similar characteristics together. It should be noted that different portions physical media that are part of the same archive may optionally be processed in different groups, for example according to different characteristics of the images.

Turning back to FIG. 2, in the second stage of the overall exemplary method according to the present invention, known as the "scan tuning" stage, the parameters are preferably set in order to ensure that quality of the resulting image is as high as possible. Such parameters may optionally include but are not limited to: resolution, density and brightness. Scan tuning is optionally and preferably performed in order to increase the efficiency of the scanning process, and is more preferably determined also according to the parameters and the detailed procedure for actually scanning the microfilm and/or other physical media that are obtained from stage 5 of the method of FIG. 3A.

Figure 3B:
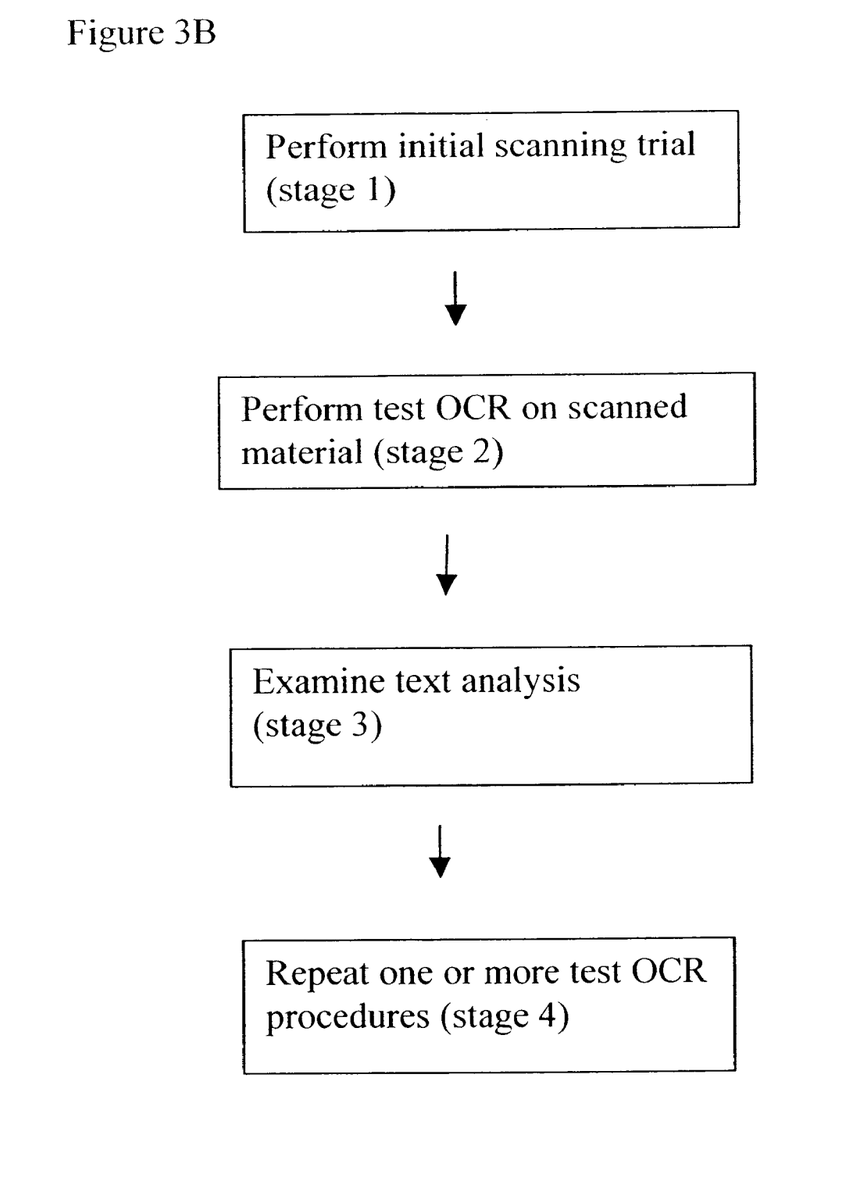

According to preferred embodiments of the present invention, scan tuning is also performed according to an exemplary method of the present invention, shown with regard to FIG. 3B. In stage 1, general parameters from the method of FIG. 3A are used to perform an initial scanning trial. In stage 2, a test OCR is performed on the scanned material. In stage 3, the resultant text analysis is examined statistically, in order to quantitatively assess the overall quality of the OCR test and hence, of the scanned images. Optionally, in stage 4, one or more test OCR procedures are repeated, more preferably with altered parameters, in order to further fine-tune the parameters for the scanning procedure.

Most preferably, the above referenced test scan or scans are only performed on a small portion of the physical media to be scanned, in order to increase the efficiency of the overall procedure.

Turning back to FIG. 2, in stage 3, the "scanning phase" is performed, in which each microfilm reel and/or other portion of physical media is scanned, more preferably using the scanning parameters set in the scan tuner phase to create digitized images of the microfilmed documents, such as newspaper issues for example. The output of the scanning phase is a set of image files, one for each microfilmed page. Because each reel typically contains more than one issue, optionally and preferably the image files are renamed in such a way that each one of the issues can be identified. This is handled in the next phase or image preparation phase, and is more preferably performed according to standard naming conventions. For example file names might represent combinations of informative data such as the issue date, the issue page number, the publication identifier etc.

The next stage is profile tuning, which is optionally and more preferably performed manually. This stage preferably includes quality control and assurance processes, which are more easily performed by a human operator. These processes examine the output result, and more preferably compare this result to the input physical media, in order to check for errors, and so forth.

According to preferred embodiments of the present invention a profile is a set of properties that describe the processing parameters for the newspaper issues which preferably consists of recognition parameters and output repository parameters.

Once the profile settings are completed, the next stage includes job generation.

According to preferred embodiments of the present invention, the user generates jobs descriptors with the use of a job generator component which allows the user to specify parameters for automatic generation of job descriptors. Alternatively, the jobs may optionally be generated automatically.

Figure 3C:
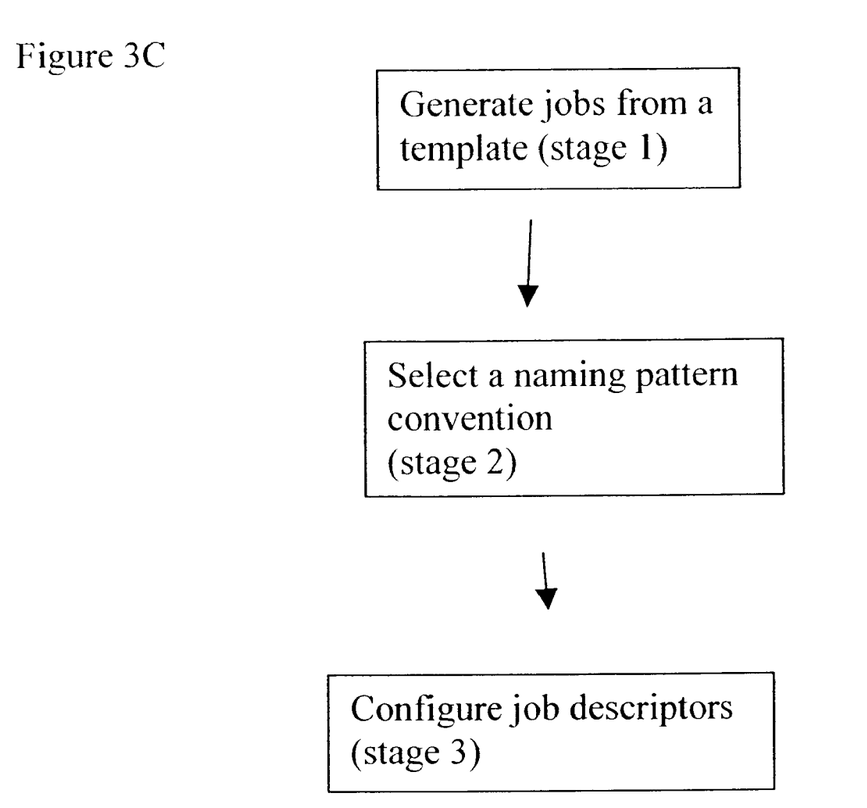

The jobs are optionally and preferably generated according to the method shown in FIG. 3C. As shown, in stage 1, a job template is used to generate jobs. Next in stage 2, a naming convention pattern is selected. In stage 3, job descriptors are configured and ready for use.

Turning back to FIG. 2, the automatic processing stage is then preferably performed. In this phase the system receives a job, which preferably consists of one or more image files, a job descriptor and a profile, as input and generates a repository preferably consisting of data in an XML format.

First, a complete issue is preferably recomposed by assembling all of its pages. Then each image is cropped in order to remove any black margins and any skews are corrected. Next the general layout of the page is analyzed. Next segmentation is performed in which the page is broken down into its component parts which enables each article and article element to be distinguished. Segmentation may optionally and alternatively be carried out manually.

After segmentation Optical Character Recognition (OCR) technology is preferably applied separately to each elements found in the page. After OCR, there is a segmentation improvement phase in which segmentation is reapplied based on the results of the OCR.

Finally the text generated in the OCR phase and the image file are preferably stored in a repository, more preferably as XML and page object image clips.

This method may optionally be performed as described in PCT Application No. IL01/00797 which was previously incorporated by reference as if fully set forth herein. Briefly, the disclosed method is for automatic recognition of objects on the document page, which are then output in a format such as XML for example. Therefore, the document page is viewed as a collection of individual objects, which are organized according to a particular order on the document page. Examples of such objects include, but are not limited to, a picture, a story, a headline, advertisements and so forth. With regard to each article of a newspaper, additional examples include, but are not limited to, roof title, abstract, subtitle, lead, caption, continuation, byline and so forth. These objects may optionally be rearranged according to any desired order for the final output, and are preferably not limited only to the order which is required for printing on the printed paper version of the newspaper or other document. Optionally and more preferably, the objects are first classified according to different types, for example according to the type of content, before being organized into the final output.

For example, text segments may optionally be determined according to a text line or portion of line which lies inside one column of the document page. Preferably, the attributes of the text segments are also determined by using style sheets or layout guidelines. Next, text blocks are built. Each text block preferably consists of a set of aligned text segments with the same or similar styles. Next, the graphic blocks are determined from the graphic elements. Each graphic block consists of a set of graphical elements, which lie in a single rectangular area.

Next, separate articles of the newspaper, or other units of information, are preferably extracted to form each entity. Each entity consists of a set of blocks which represents an article, advertisement, single photo or data. These entities are examples of the segments of the document. OCR can then more easily be performed on the text blocks.

According to preferred embodiments of the present invention each newspaper issue is stored as a self-contained unit within the larger structure of the repository.

Figure 4:
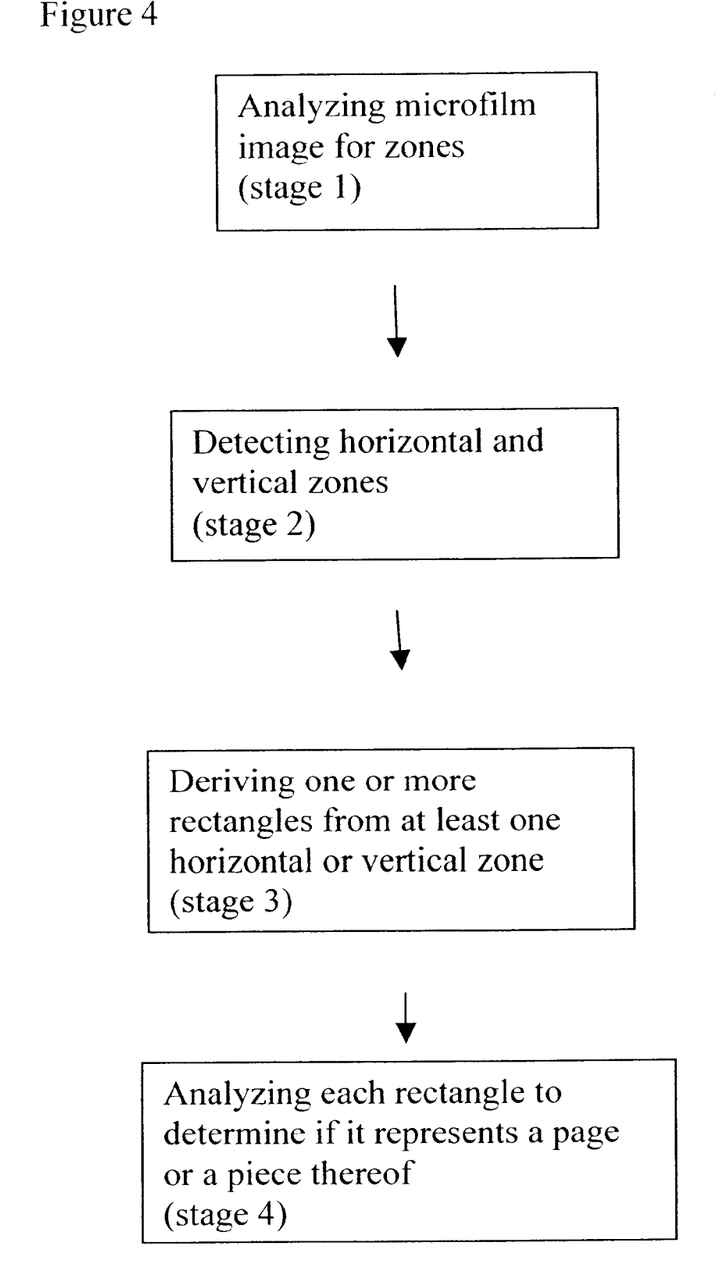
FIG. 4 is a flowchart of an illustrative method according to the present invention for analyzing scanned microfilm images.

FIG. 4 describes an exemplary, optional but preferred method according to the present invention for analyzing microfilm data. This method is optionally and preferably used with regard to stage 2 of FIG. 2.

As shown in stage 1, the scanned microfilm image is first analyzed to determine the search zones for vertical page separation. These zones are preferably determined by building a graph of the number of black pixels for each column of the image. The black areas are defined as having a very high number of black pixels. These areas are then considered to be vertical delimiters between neighboring pages.

If the microfilm image is not black and white, then preferably stage 1 first comprises converting the pixel data, whether as color data or grayscale data, to a binary scale. The remainder of the method can then preferably be performed as described.

In stage 2, for each vertical zone detected previously, a graph is created which contains the number of black pixels in each row of the zone. Zones which have a high number of black pixels are considered to be horizontal delimiters between pages.

Preferably, the dimensions of one or both of the horizontal and vertical delimiters are examined, in order to confirm that each delimiter has been accurately detected. For example, if one or more dimensions are not of a minimum size, then the delimiter may actually be some other type of feature. Such a feature could be a damaged area, such as a scratch on the microfilm or a photograph for example, or some other type of feature which is not a delimiter.

In stage 3, one or more rectangles are preferably derived from the horizontal and vertical delimiters. For example, the horizontal and vertical delimiters preferably provide the boundaries of an actual rectangle. Each such rectangle may optionally represent a page or a piece of a page, and hence is preferably further analyzed.

In stage 4, each rectangle is preferably further analyzed to determine whether it represents a piece of a page, or an entire page. This analysis is preferably performed by determining whether an additional vertical delimiter is present at one side, and whether this additional delimiter is regular in its dimensions. For example, the boundaries of the page (horizontal and vertical delimiters) should be complete, such that a complete rectangle is formed. Otherwise, a portion of a page may have been inadvertently been removed from the rectangle in the image. The presence of such an additional delimiter is more typical of an entire page rather than a piece of a page. Obviously, other such analyses could optionally be performed, in addition to or in place of this analysis.

Figure 5A:
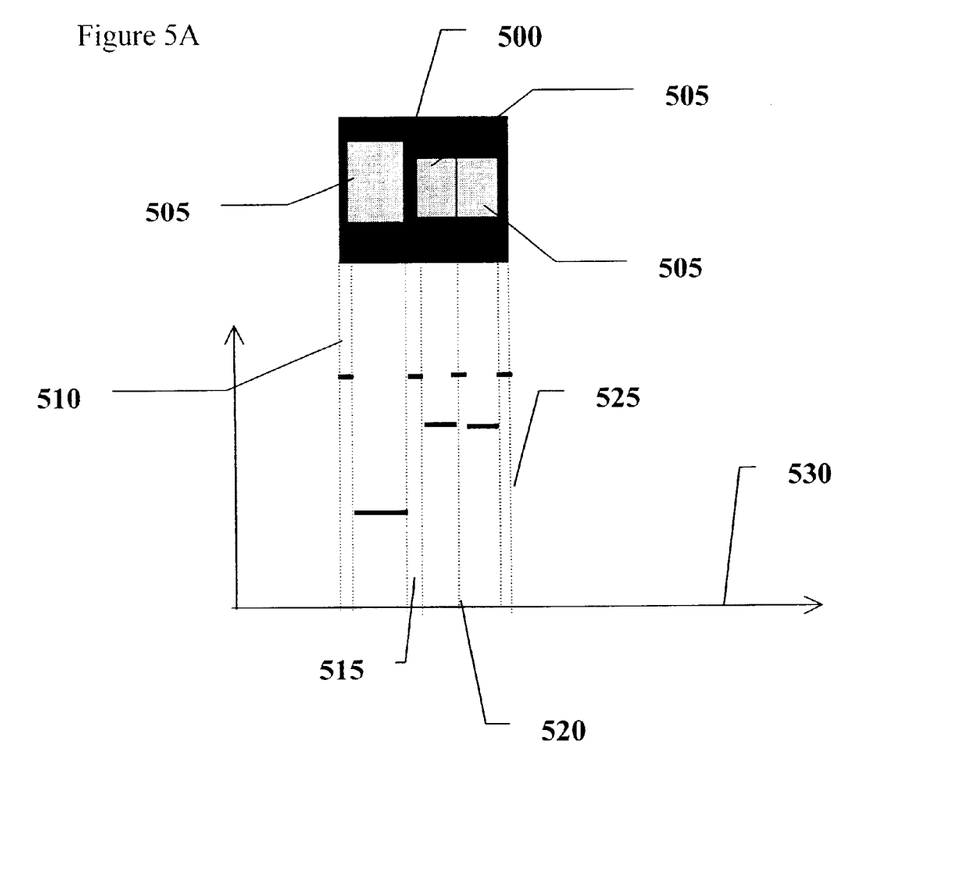
FIG. 5 illustrates two graphs obtained during the performance of the method of FIG. 4.

FIGS. 5A and 5B illustrate some examples of the graphs produced during this analysis. It should be noted that these are given for the purposes of illustration only and without any intention of being limiting. As shown in FIG. 5A, an image 500 optionally features a plurality of pages 505, which may optionally be of different sizes. Vertical delimiters 510, 515, 520 and 525 are preferably detected according to a graph of the pixel densities, as shown as a graph 530. For example, for the typical microfilm image, the portions between the pages, which form the delimiters, are typically black.

Figure 5B:
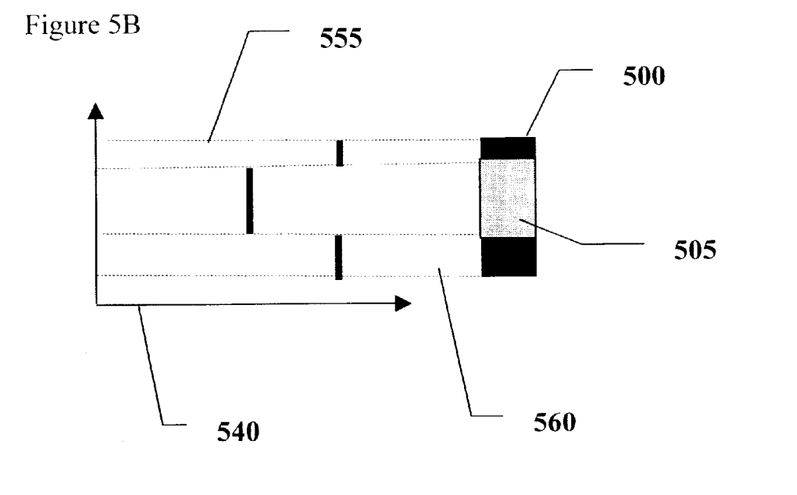

FIG. 5B shows another image, in which a graph 540 is preferably formed according to the horizontal densities of a portion of image 500, shown as a page 505. Horizontal delimiters 555 and 560 are detected according to graph 540.

According to optional but preferred embodiments of the present invention, skewed images and/or images with non-linear distortion are further treated by dividing the image into a plurality of portions according to a grid. Next, each cell of the grid is preferably analyzed as described above. Scratches or other non-linear distortions may optionally be detected more according to dimensions than according to regularity. Artifactual delimiters, such as photographs or other sources of large areas of black pixels are optionally detected according to size. All of these features are not actually delimiters and/or rectangles, but may appear as such during the processing of the image.

More preferably, such artifacts of the image processing are detected according to empirical data and/or parameters. For example, the minimum dimensions of a vertical and/or a horizontal delimiter may optionally and preferably be determined according to empirical parameters. These parameters in turn may optionally and more preferably be determined according to statistical analysis of a plurality of images, most preferably accompanied by manual classification of the different types of features on the image. This analysis enables accurate statistics to be gathered, after which minimum and/or maximum thresholds for the correct dimensions may optionally be determined. Other features may also be classified as delimiters and/or rectangles, or alternatively as artifacts, according to this process. While the invention has been described with respect to a limited number of embodiments, it will be appreciated that many variations, modifications and other applications of the invention may be made.

What is claimed is:

1. A method for automatically converting microfilm-type data to a digital format, wherein the microfilm-type data is of a document, the document featuring at least one page, the method comprising:

creating at least one digital image of the microfilm-type data, determining at least one production parameter for automatic conversion;

automatically processing said at least one digital image according to said at least one production parameter to convert the microfilm-type data said automatic processing comprising:

analyzing a layout of said image, wherein said analyzing comprises recognizing at least one page or a piece thereof of the microfilm-type data;

segmenting said image; and performing OCR (optical character recognition) on said image, improving segments of said image after said OCR, analyzing said image to build a graph of pixels of said image;

determining at least one search zone for vertical page separation according to said graph;

within each search zone, determining at least one vertical delimiter according to said graph;

within each vertical delimiter, building a graph of pixels of each row of said vertical delimiter;

detecting each horizontal delimiter according to said graph of each row; and deriving at least one rectangle from at least one horizontal delimiter and/or at least one vertical delimiter, wherein each rectangle represents a page in the microfilm-type data or a piece thereof.

2. The method of claim 1, wherein said at least one production parameter includes preparation of a production profile.

3. The method of claim 2, wherein said production profile includes information about visual quality of the microfilm-type data.

4. The method of claim 2, wherein automatically processing said at least one digital image includes performing optical character recognition (OCR), and wherein said production profile includes determining a quality of said OCR.

5. The method of claim 1, wherein said automatic processing is performed for a plurality of different sets of microfilm-type data substantially simultaneously, such that said determining at least one production parameter includes creating a job for each set of microfilm-type and executing each job in said automatic processing phase.

6. The method of claim 1, further comprising:

analyzing said at least one rectangle to determine whether said rectangle represents said page or said piece of said page.

7. The method of claim 1, wherein each delimiter is determined according to a calculation of a relative number of one type of pixels in said image in said graph, wherein said pixels are classified according to a binary scheme.

8. The method of claim 1 wherein said image is at least partially distorted, and wherein analyzing said image further comprises dividing said image into a plurality of cells according to a grid, such that the remainder of method is performed on each cell.

9. The method of claim 1, wherein at least one of determining a horizontal delimiter and a vertical delimiter further comprises detecting a fictive delimiter according to dimensions of said fictive delimiter.

10. The method of claim 1, further comprising:

creating at least one repository wherein said repository consists of said at least one digital image and said converted data.

11. The method of claim 1, wherein said microfilm-type data is microfilm data.

12. A method for analyzing a scanned microfilm image, the scanned microfilm image being obtain from microfilm of a document, the document featuring at least one page, the method comprising:

analyzing the scanned microfilm image to build a graph of pixels of the image;

determining at least one search zone for vertical page separation according to said graph;

within each search zone, determining at least one vertical delimiter according to said graph;

within each vertical delimiter, building a graph of pixels of each row of said vertical delimiter;

detecting each horizontal delimiter according to said graph of each row; and deriving at least one rectangle from at least one horizontal delimiter and/or at least one vertical delimiter, wherein each rectangle represents a page in the microfilm or a piece thereof.

13. The method of claim 12, further comprising:

analyzing said at least one rectangle to determine whether said rectangle represents said page or said piece of said page.

14. The method of claim 12, wherein each delimiter is determined according to a calculation of a one type of pixels in said image in said graph, wherein said pixels are classified according to a binary scheme.

15. The method of claim 12, wherein the scanned microfilm image is at least partially distorted, and wherein analyzing the scanned microfilm image further comprises dividing the scanned microfilm image into a plurality of cells according to a grid, such that the remainder of method is performed on each cell.

16. The method of claim 12, wherein at least one of determining a horizontal delimiter and a vertical delimiter further comprises detecting a fictive delimiter according to dimensions of said fictive delimiter.

* * * * *